Jan. 17, 1939.  E. VOLLENWEIDER  2,144,210
SPROCKET FILM FEED FOR MOTION PICTURE PROJECTORS
Original Filed March 15, 1937  2 Sheets-Sheet 2
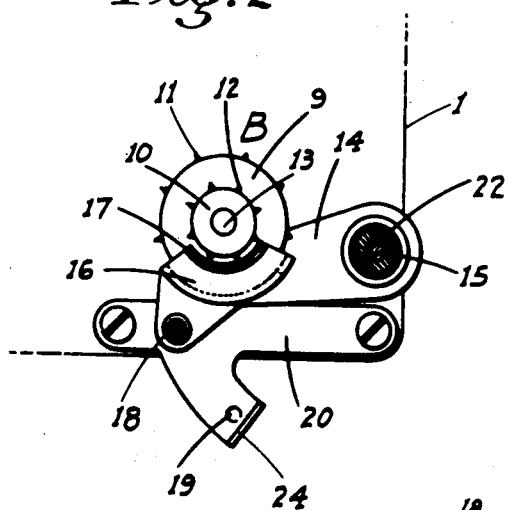
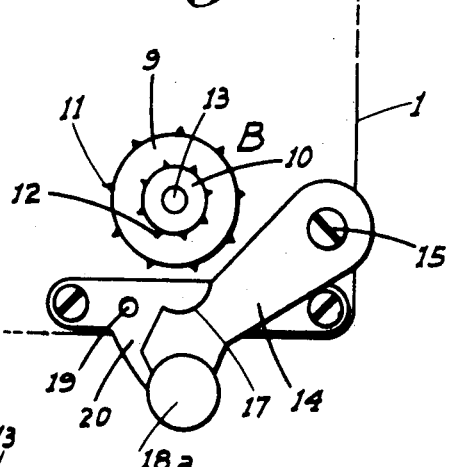
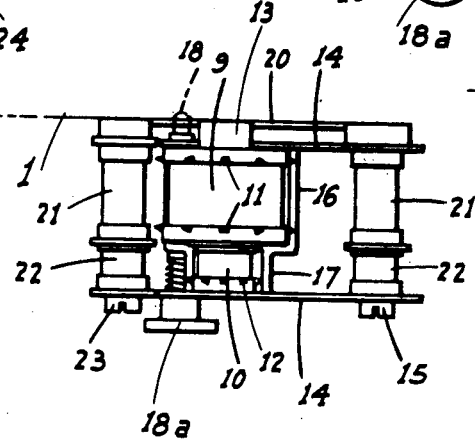
INVENTOR.
Emil Vollenweider
BY
ATTORNEY Patented Jan. 17, 1939

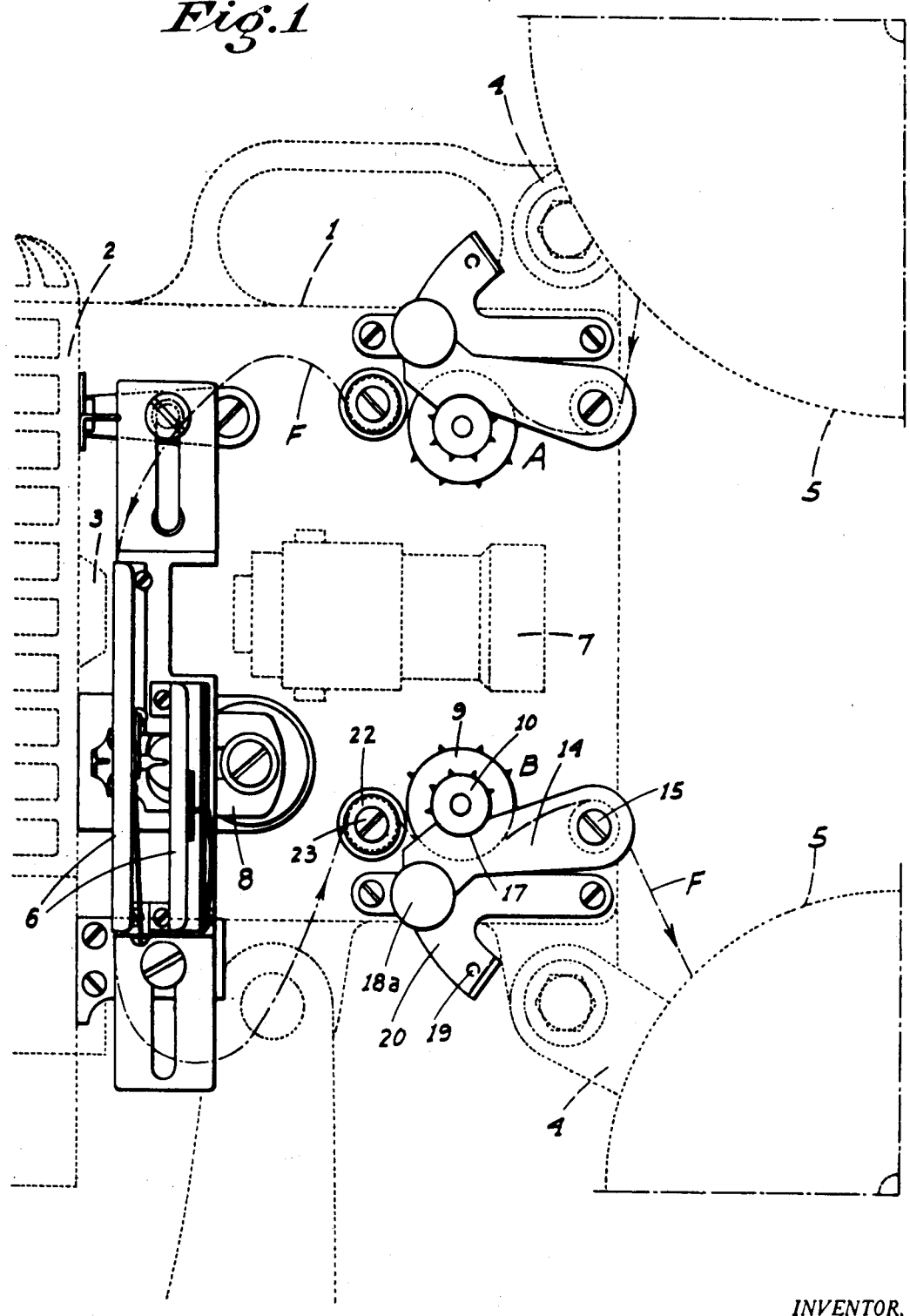

2,144,210

UNITED STATES PATENT OFFICE 2,144,210

SPROCKET FILM FEED FOR MOTION PICTURE PROJECTORS

Emil Vollenweider, Sacramento, Calif.

Original application March 15, 1937, Serial No. 131,030. Divided and this application September 28, 1937, Serial No. 166,096

3 Claims. (Cl. 271—2.3)

This invention relates generally to a motion picture projector and is directed specifically to an improved sprocket film feed device designed for use on projectors which are arranged to use film of different widths selectively. Such "double projection" projectors are of the type shown in my copending application for United States patent on Motion picture projector, Serial No. 131,030, filed March 15, 1937, and of which the present application is a division.

The principal objects of this invention are to provide a sprocket film feed device into which film of different widths may be selectively and readily engaged without the necessity of threading the same through a restricted space as is necessary on many present projectors; to provide such a device which will feed the film positively and without undue wear thereon; and to provide a film feed device which when in use effectively prevents escape of the film therefrom.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1 is a fragmentary side outline of a motion picture projector illustrating generally the position of the sprocket film feed devices on the projector relative to the film gate and film supply and take up reels.

Figure 2 is a sectional elevation of the lower sprocket film feed device illustrating the sprocket guard and the film keeper unit in place.

Figure 3 is an elevation of the lower sprocket film feed device illustrating the sprocket guard and film keeper unit in open or film threading position.

Figure 4 is a top plan view of the lower sprocket film feed device.

Referring now more particularly to the characters of reference on the drawings, the projector upon which my improved sprocket film feed devices are shown in the present instance comprises a body 1 having a ventilated casing 2 projecting laterally from one side and enclosing the usual source of light. A condenser lens 3 is mounted on the front side of the casing. Arms 4 are mounted on and diverge forwardly from the body and at their outer ends carry the spindles for removable film supply and take up reels 5.

An adjustable dual film gate, shown generally at 6, is mounted vertically on the body 1 and projects laterally therefrom between condenser lens 3 and a projecting lens 7 mounted on the side of the body some distance ahead of lens 3. An intermittent film feed or shuttle mechanism, indicated generally at 8, is mounted on the side of body 1 and is driven from within the body in the usual way. The dual film gate is constructed as shown and described in detail in my above identified copending application, Serial No. 131,030, while the intermittent film feed or shuttle mechanism is shown and described in detail in my copending application, Serial No. 166,095, filed Sept. 28, 1937.

The upper and lower sprocket film feed devices, indicated generally at A and B, which are the subject matter of the present case, are mounted on the side of the body in the usual position. As such upper and lower film feed devices are duplicates, I will describe only the lower device B in detail.

This lower sprocket film feed device B comprises axially alined, concentric sprocket sections, indicated at 9 and 10 respectively; the larger section 9 being of correct diameter and width to engage and feed 16 mm. film while the other and smaller section 10 is of correct diameter and width to engage and feed 8 mm. film. The section 9 is provided with two circumferential rows of sprocket drive teeth 11 spaced to correspond to the spacing of the rows of openings in 16 mm. film, while section 10 has only one circumferential row of teeth 12 to engage the 8 mm. film. These axially alined, concentric sections are integral and rotatably mounted on a shaft 13 projecting through the side of the body 1 in the usual position. Such shaft is driven at proper speed in the usual manner.

A sprocket guard and film keeper unit is mounted adjacent the integral sprocket sections 9 and 10 and comprises spaced arms 14 pivoted on a bolt 15 parallel to shaft 13 for swinging movement toward and away from the sprocket sections, and a keeper having segmental arcuate portions 16 and 17 to extend part way about the sprocket sections 9 and 10 respectively, to maintain a film in engagement with the adjacent teeth. The arcuate sections are of proportionate size, as well as concentric with axis of the sprocket sections when the guard is in operative position; the sprocket teeth then just clearing the bottom of the arcuate portions. A spring pressed detent 18 having an operating knob 18a, extends through the free ends of the arms 14 below portions 16 and 17 and selectively engages sockets 19 in a back plate 20 whereby to maintain the guard in either operative or inoperative position. Free running rollers 21 and 22 grooved to receive 16 mm. and 8 mm. film, respectively, guide the film F to and from the sprocket sections. The rollers 21 and 22 at the pivoted end of arms 14 are carried on bolt 15 while the other set of rollers 21 and 22 are carried on another bolt 23 which projects from the side of the body adjacent the sprocket sections but on the opposite side thereof from bolt 15. An out-turned flange 24 on the outer end of the projecting portion of back plate 20 limits movement of the guard away from the sprocket sections, and when so moved the arms 14 as well as the arcuate head are well clear of the sprockets. With the sprocket guard and film keeper in such open or inoperative position, the length of film F extending between the adjacent reel 5 and film gate 6 may be easily inserted edgewise through the relative large space between the movable unit and either sprocket section and engaged with sprocket teeth of the proper sprocket section. The movable sprocket guard and film keeper unit is then swung back into closed and film keeping position. The film is then positively prevented from leaving the sprocket regardless of whether or not the film slacks on either side of the device.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a motion picture projector arranged to project films of different widths selectively, and including a body, a driven shaft projecting from the body, and a film feed sprocket mounted on the shaft in close proximity to the body; said sprocket comprising a pair of axially alined concentric sprocket sections to receive and drive film of different widths, the outer sprocket section being of less diameter than the inner sprocket section and arranged to receive and drive the film of least width.

2. In a motion picture projector arranged to project films of different widths selectively, and including a body, a driven shaft projecting from the body, and a film feed sprocket mounted on the shaft in close proximity to the body; said sprocket comprising a pair of axially alined concentric sprocket sections to receive and drive film of different widths, the outer sprocket section being of less diameter than the inner sprocket section and arranged to receive and drive the film of least width, a film feed keeper arranged for simultaneous cooperation with both sprocket sections, and means mounting the keeper for radial swinging movement from a film keeping position to a position clear of the circumferential plane of the sprocket section of greatest diameter.

3. In a motion picture projector, a driven film feed sprocket including a pair of axially alined concentric sprocket sections, one section being of greater diameter than the other, a film keeper including a pair of segmental and arcuate faces each corresponding with and of substantially the same width as one of the sprocket sections, said faces being formed on concentric diameters proportionate to the diameters of the corresponding sprocket sections whereby one face is offset radially relative to the other, and means mounting the keeper for movement to and from a film keeping position, the faces of the keeper being concentric with the sprocket sections when said keeper is disposed in such film keeping position.

EMIL VOLLENWEIDER.